Oct. 29, 1957    R. W. KRITZER    2,811,204
APPARATUS FOR MAKING HEAT TRANSFER COILS
Filed Oct. 1, 1953    7 Sheets-Sheet 1
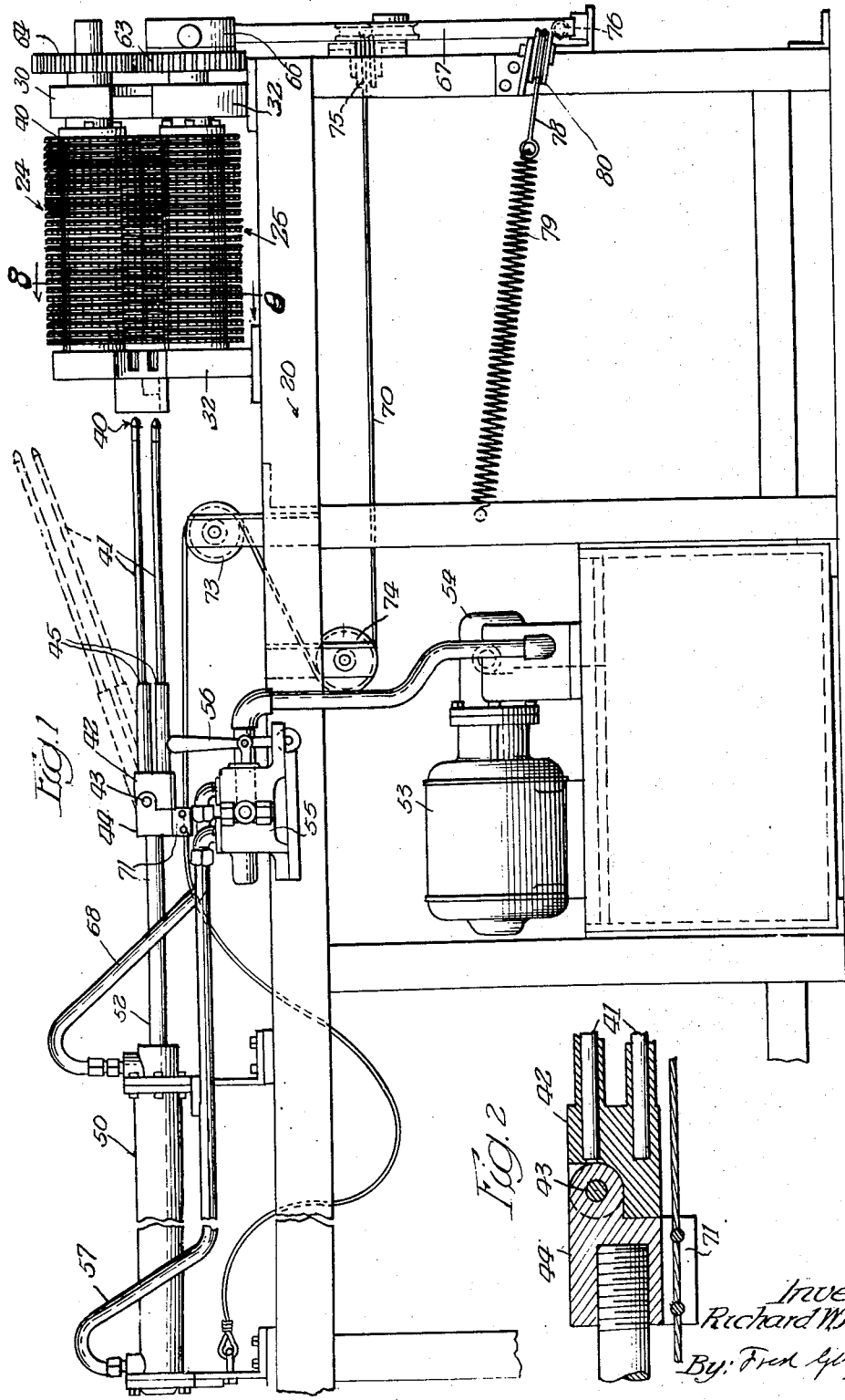

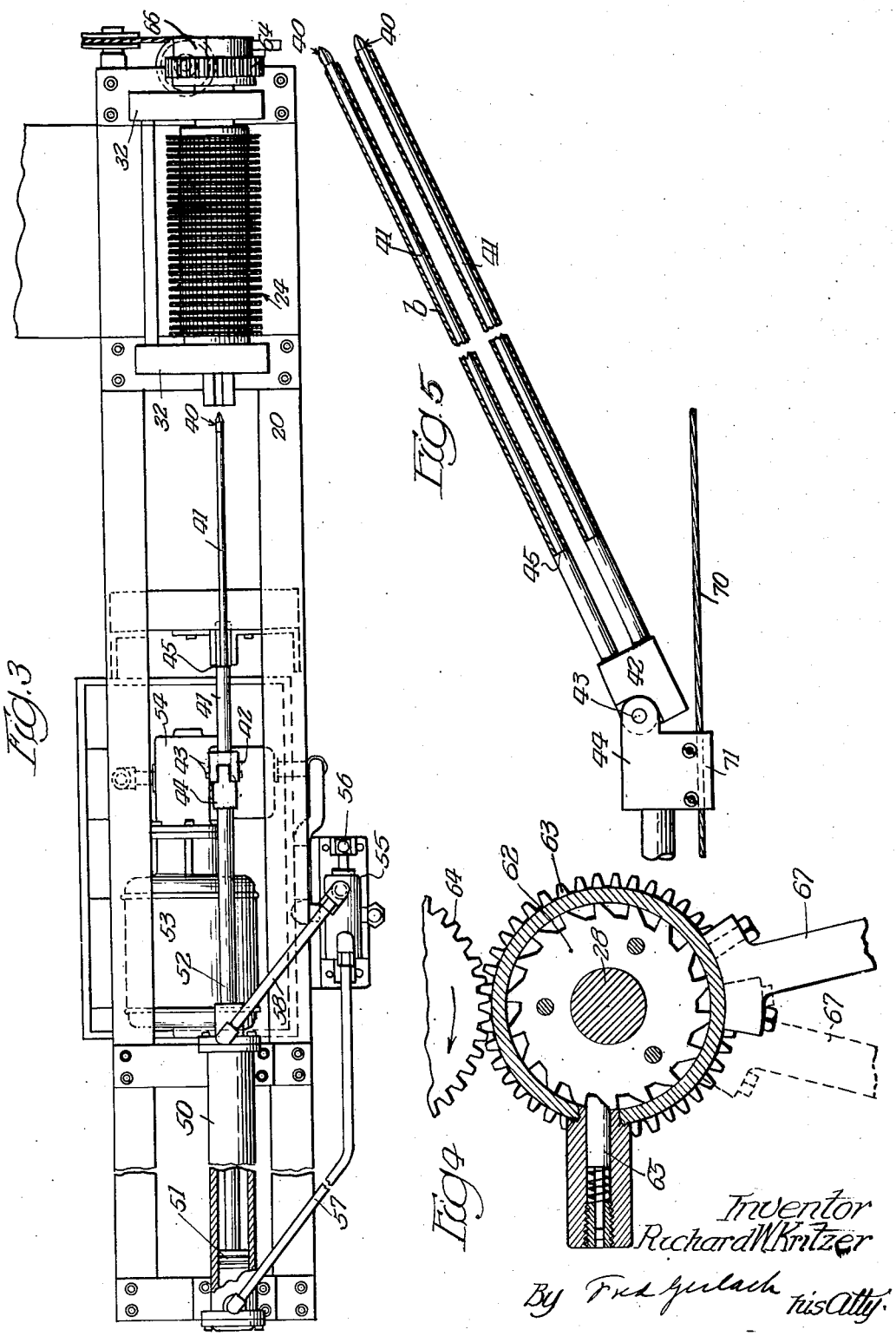

Oct. 29, 1957 R. W. KRITZER 2,811,204
APPARATUS FOR MAKING HEAT TRANSFER COILS
Filed Oct. 1, 1953 7 Sheets-Sheet 3
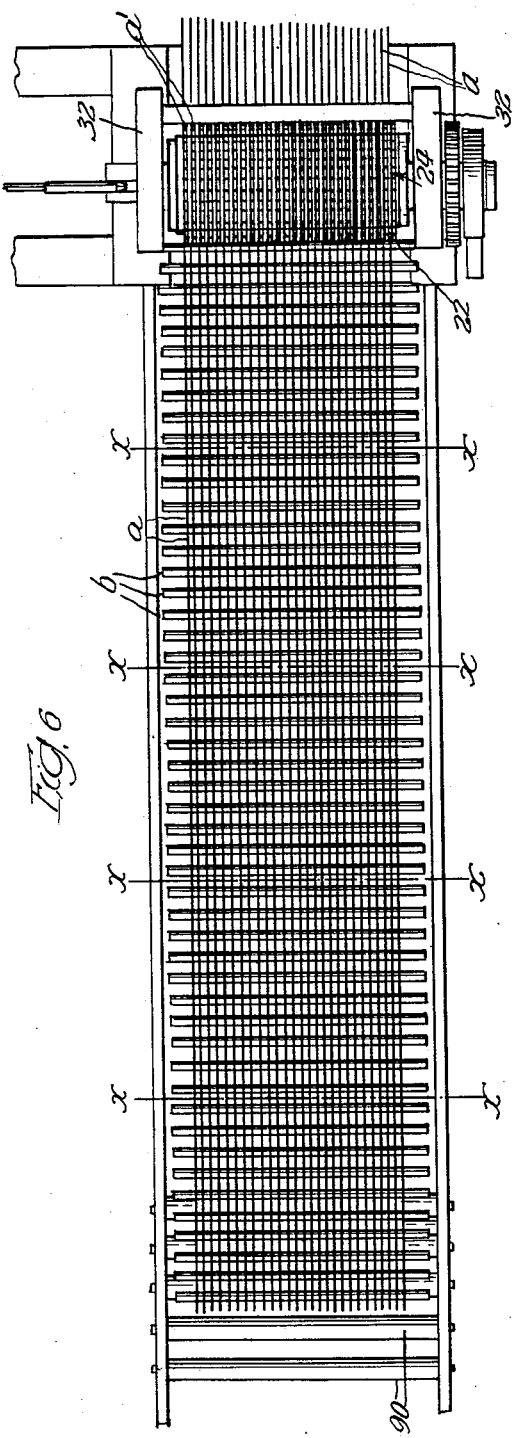
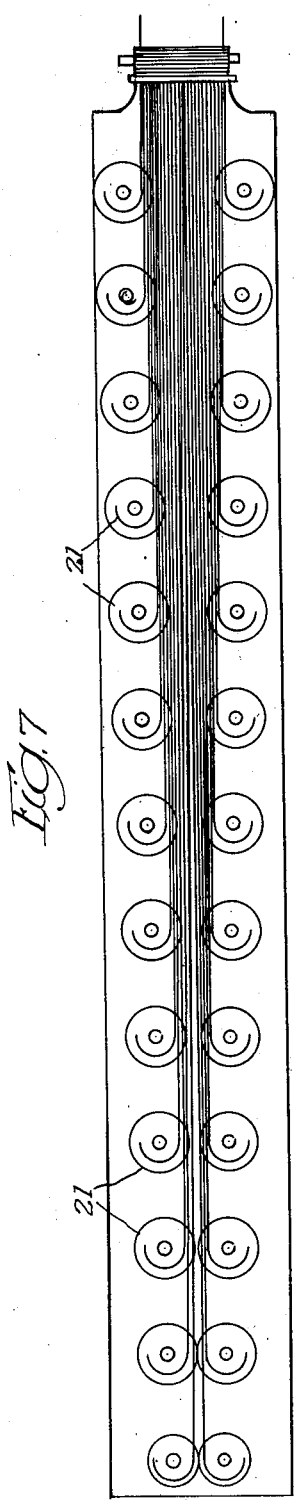
Inventor
RICHARD W KRITZER
By Fred Gerlach his Atty.

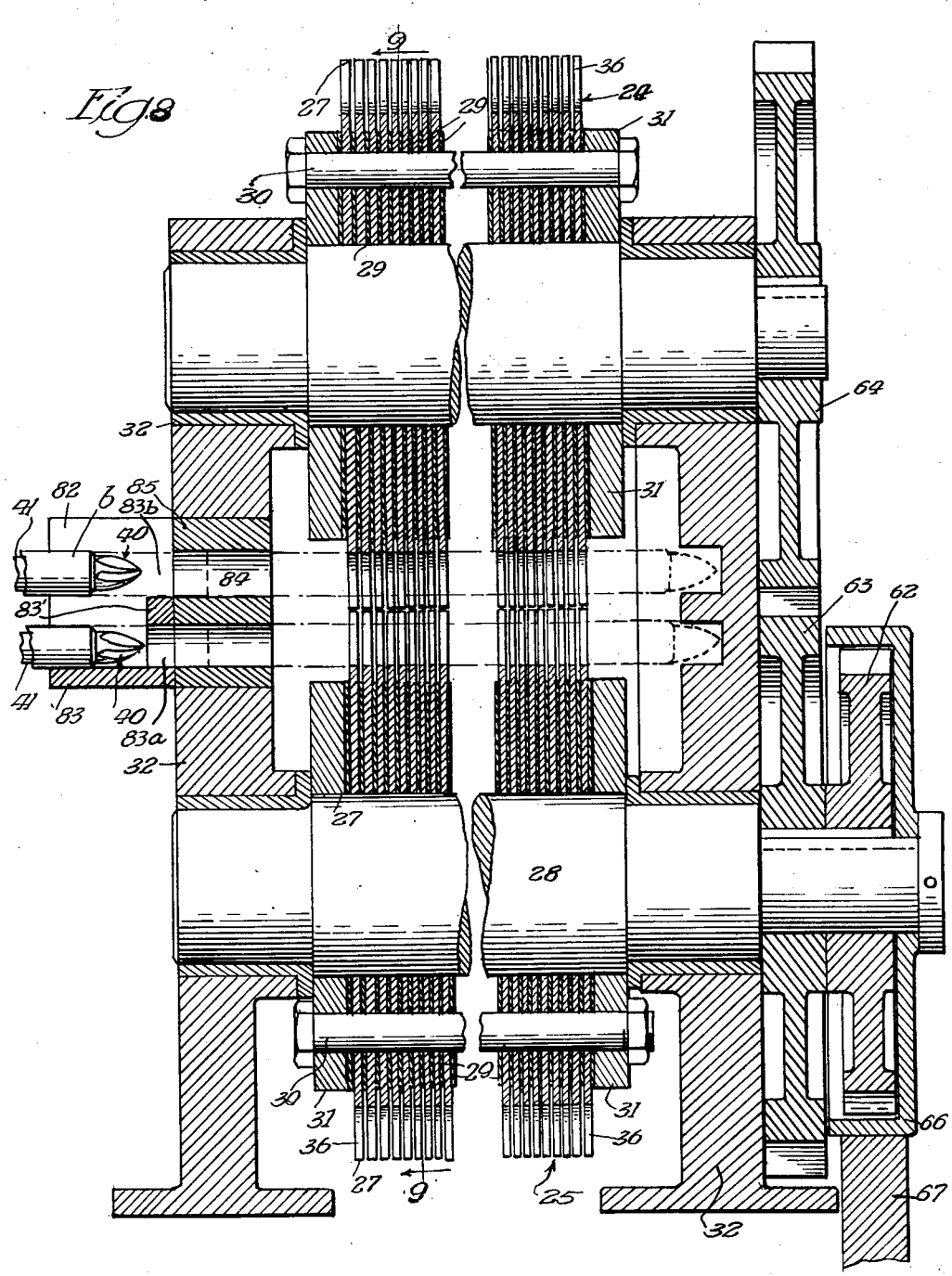

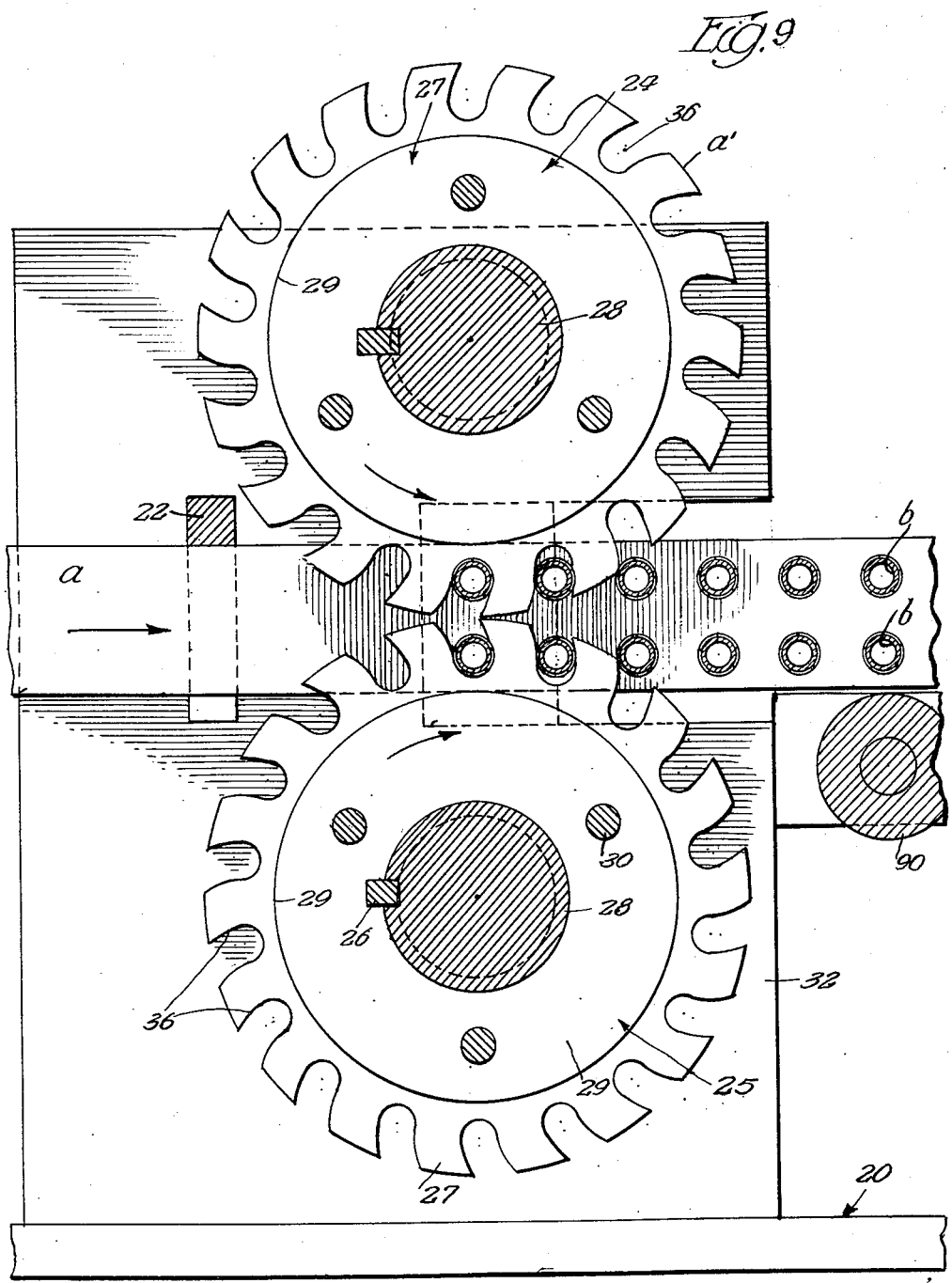

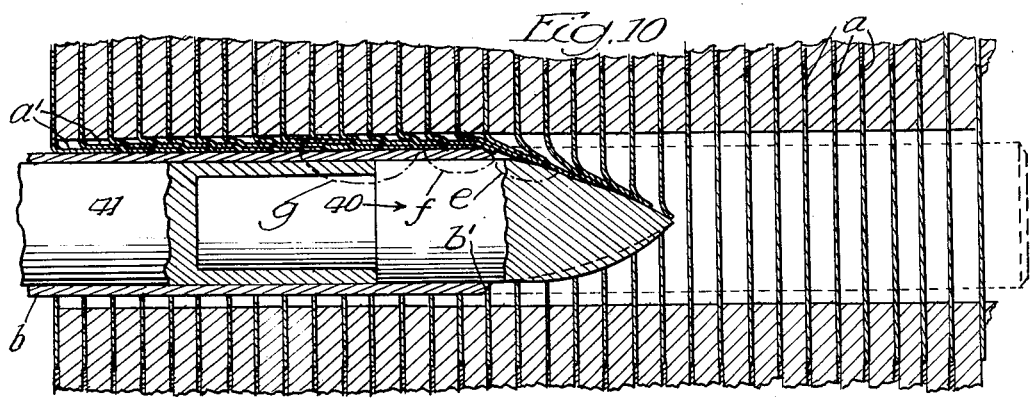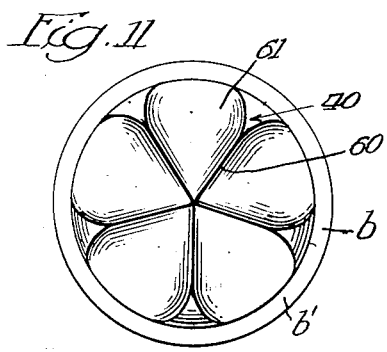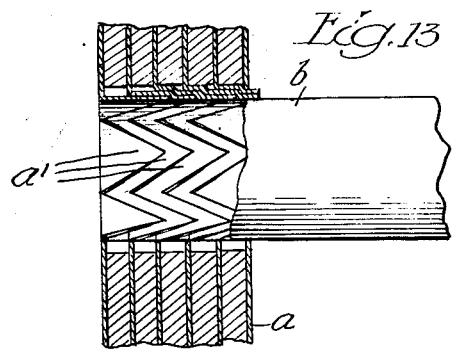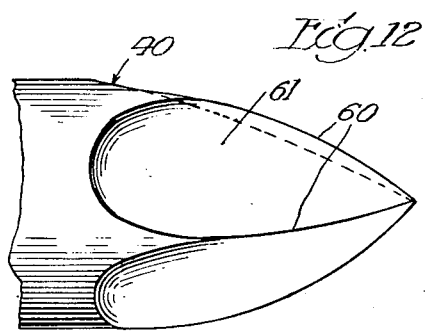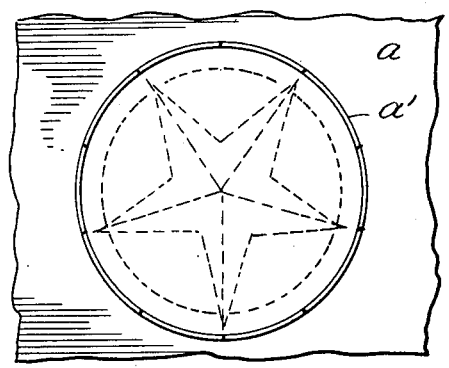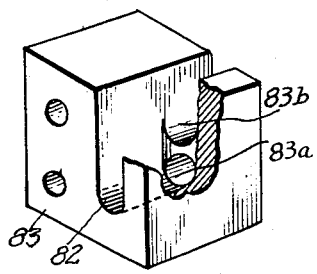

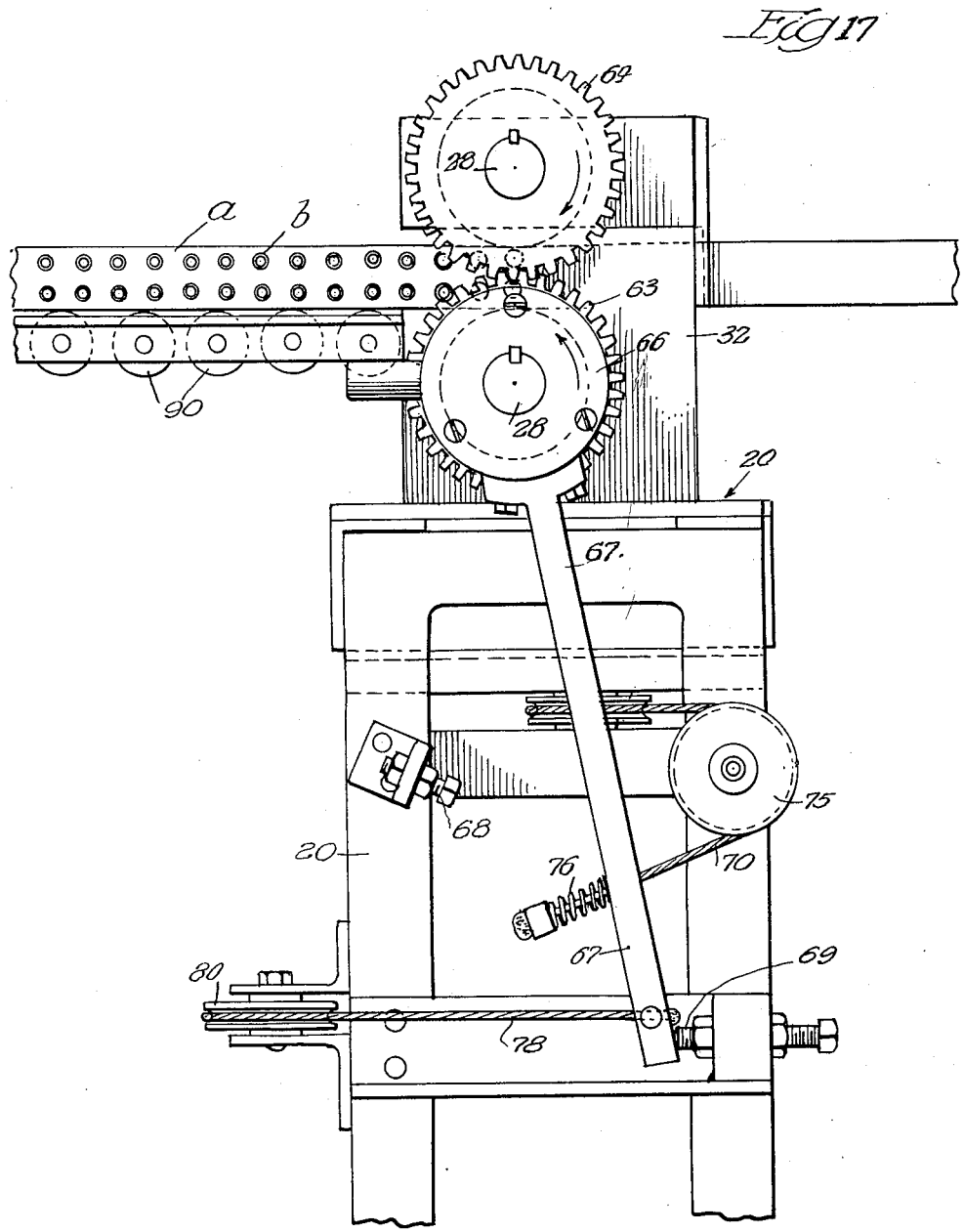

United States Patent Office 2,811,204
Patented Oct. 29, 1957

2,811,204

APPARATUS FOR MAKING HEAT TRANSFER COILS

Richard W. Kritzer, Chicago, Ill.

Application October 1, 1953, Serial No. 383,557

7 Claims. (Cl. 164—87)

The invention relates to apparatus for making heat exchange units which embody sections of tubing and cross-fins secured thereon.

One object of the invention is to provide apparatus for producing heat exchange units of this type by which a series of strips of flexible sheet fin-stock are supported in parallel and fixedly spaced relation, are successively punctured and ruptured to form aligned holes surrounded by integral tongues of greater length than the spaces between the strips, successively bending the tongues across said spaces and into interlapped relation, and enlarging the holes by forcing through them and between the tongues, tubing sections of the unit having a greater diameter than the previously formed holes and simultaneously expanding and reshaping the tongues for a tight press-fit around, and to conform their inner faces to, the periphery of the tubing section and thereby fixing the fins in spaced and efficient thermal relation on the tubing.

Another object of the invention is to provide improved apparatus for forming and attaching fins to tubing-sections, from continuous webs of flexible fin-stock.

Another object of the invention is to provide apparatus for making heat exchange units which embody tubing sections and a series of spaced cross-fins on the tubing which comprises fixedly securing successive portions of a series of continuous strips or webs of flexible fin-stock in the spaced relation of the fins, successively cutting aligned holes spaced in the entire series of said portions, successively inserting endwise and securing sections of tubing in said aligned holes, intermittently advancing the leading-end portions of the entire series of webs and the inserted tubing, to position the webs for successive web-cutting and tube-inserting operations, and for continuously producing a connected series of units and severing the webs to form individual units consisting of tube-sections and cross-fins.

Another object of the invention is to provide apparatus for making heat exchange units having sections of tubing and spaced cross-fins, expeditiously and economically.

Another object of the invention is to provide apparatus for fabricating heat exchange units having sections of tubing and spaced cross-fins, which includes mechanism for supporting the portions of a series of strips of flexible fin-stock for the fins respectively, successively cutting holes in the entire series of said end portions, inserting endwise and securing sections of tubing in said holes, advancing the series of strips for successively cutting holes in and inserting tube-sections along the strips, so that units may be continuously produced by severing the strips between the inserted tube-sections.

Another object of the invention is to provide improved apparatus for making heat exchange units which embody tube-sections and a series of spaced cross-fins.

Other objects of the invention will appear from the detailed description.

The invention consists in the several novel features hereinafter set forth and more particularly defined by claims at the conclusion thereof.

In the drawings:

Fig. 1 is a side elevation of said apparatus;
Fig. 2 is a detailed section of the pivotal connection for supporting the stems which carry and operate the piercing tools and the tube-sections which are forced through the fin-stock;
Fig. 3 is a plan view of said apparatus;
Fig. 4 is an end view, parts being shown in section, of the mechanism for rotating rolls step-by-step to advance the webs of fin-stock after the tube-sections have been secured therein;
Fig. 5 is a detail showing the stems which carry the piercing tools and the tube-sections swung into raised position for loading the tube-sections on the stems;
Fig. 6 is a plan illustrating the tube-sections in the continuous strips of fin-stock before the strips are severed for individual heat exchange units;
Fig. 7 is a diagrammatic view of the arrangement of spools for supporting the webs of fin-stock;
Fig. 8 is a section taken on line 8—8 of Fig. 1;
Fig. 9 is a section taken on line 9—9 of Fig. 8;
Fig. 10 is a section on an enlarged scale through a series of the webs of fin-stock which illustrates the manner of piercing the stock to form holes therethrough and forming tongues surrounding the holes and reshaping of the tongues by a tube-section of the heat exchange unit with a tight press-fit between the tube-sections and the fins;
Fig. 11 is an end view of the piercing tool with a section of tubing thereon;
Fig. 12 is a side elevation of the piercing tool;
Fig. 13 is a section illustrating the fins on a tube-section, a portion of the tube-section being broken away to illustrate the interlapping of the tongues on the fins;
Fig. 14 is a diagrammatic side view of a portion of one of the fins, and indicating by dotted lines the successive shapes of the tongues while the webs are being pierced and the holes therein enlarged by a tube-section:
Fig. 15 is a perspective of the block which guides the tube-sections and cutting tools laterally to the advancing rolls;
Fig. 16 is a perspective of the block which guides the tube-sections and cutting tools vertically during their operative strokes; and
Fig. 17 is an end elevation of the apparatus.

The apparatus comprises generally: means for supplying a series of continuous webs $a$ of flexible fin-stock, usually metal, one for each cross-fin in a completed unit, coacting rolls for fixedly supporting the leading portions of the webs in spaced relation of the fins, a pair of tools for successively piercing and rupturing the webs of said series to form aligned holes therein and bending integral tongues of greater length than the spaces between the strips and around said holes into interlapping relation, and means for driving tube-sections through said holes and enlarging them, the tube-sections having a sufficiently greater diameter for simultaneously expanding and reshaping the tongues for a press-fit around and to conform their inner faces to the periphery of the tube-sections and thereby fixing the fins on the tubing in the spaced relation desired in the completed units and for efficient thermal relation. The apparatus is also adapted for successive fin-cutting and tube-inserting operations with a series of continuous webs, and includes mechanism for intermittently advancing the webs of the tubing at the points in which they are spaced apart in the completed units, the webs being adapted to be severed to form individual units.

The invention is particularly advantageous in attaching fins of a great number and unusually thin in cross-section to the tubing; in eliminating the necessity of any soldering between the tubing and the fins; in achieving contact between thin fins and the tubing for high thermal efficiency; in achieving high production; and in producing the units with a large number of cross-fins at a low cost. This apparatus is adapted to simultaneously pierce aligned holes and to cut and bend tongues around the holes in the entire series of webs and insert a pair of tube-sections through the webs to expedite fabrication of the units.

The apparatus is adapted to force tube-sections through long webs of fin-stock in spaced relation according to the finished unit and the webs are fed to the tube-inserting mechanism until tube-sections have been inserted throughout the length of the webs, for expeditious production of the units.

This apparatus includes a supporting structure or frame 20 of any suitable construction. A supply of continuous webs or rolls of flexible fin-stock from which the fins of the units are successively or serially formed, with a web for each fin in the completed heat transfer unit, is provided by a series of reels 21. Each reel may have wound thereon webs in multiple for space-saving purposes, when each unit is formed with a large number of cross-fins of thin stock. The leading end portions of the entire series of webs are individually guided by a combbar 22 to a pair of coacting rolls 24 and 25. Rolls 24 and 25 are equipped to individually support, during the fin-piercing and tube-inserting operation, the leading portions of the entire series of webs $a$ for producing fins of the number required in each unit. In other words, the rolls 24 and 25 individually support the number of webs $a$ required for each heat transfer unit. Rolls 24 and 25 are rotatable step-by-step to advance the entire series of webs and the inserted tube-sections from the fin-piercing station, and to position following portions of said webs for successively driving the tube-sections through the strips of fin-stock in the spaced relation desired in the completed units.

Each of the rolls 24 and 25 comprises a series of discs or elements 27 which are secured by a key 26 for rotation by its shaft 28. The discs 27 are spaced apart longitudinally on shaft 28 by spacing washers 29. The discs 27 and spacers 29 are clamped together along shaft 28 by screw rods 30 and end plates 31. Shafts 28 are journalled in supporting bracket 32 which are mounted on the frame 20. The discs 27 are spaced apart by washers 29 to form annular grooves in which the strips of fin-stock are confined transversely during the fin-piercing and tube-inserting operations. The edges of the strips of fin-stock extend between the peripheries of the spacers 29 on rolls 24 and 25 and are thereby securely confined against movement vertically or in the plane of the webs.

Resultantly, the leading end portions of the strips $a$ are individually supported transversely for the fin-piercing and tube-inserting operation and against movement in and between the rolls while the rolls are stationary. These discs 27 and spacers 29 secure the leading end-portions of the entire series of strips for the cross-fins of a complete heat transfer unit, spaced apart in accordance with the spacing of the fins desired in the completed unit.

The discs 27 of each of the rolls 24 and 25 are provided with circumferentially spaced series of aligned notches or slots 36 through which piercing tools 40, hereinafter described, and the tube-sections $b$ are adapted to pass. The edges of slots 36 coact with said tools in piercing and cutting the webs and bending the tongues around the holes and with the tube-sections $b$ for enlarging the holes for a tight press-fit between the inner peripheries of the tongues and the outer periphery of the tube-sections. The open ends of slots 36 in discs 27 permit the inserted tube-sections to pass out of the rolls 24 and 25 and to move rectilinearly with the fin-strips $a$ after each fin-cutting and tube-inserting operation.

A pair of piercing tools 40 are mounted on a pair of stems or mandrels 41 which are connected to a bracket 42 which is pivoted at 43 to a head 44. Head 44 with the stems 41 thereon and the tools 40 on the stems are reciprocable by power to operate said tools and stems through the series of strips of fin-stock and the slots 36 in the rolls 24 and 25. A piercing tool 40 is fixedly secured to the outer end of each of the stems 41 and is provided with tapered alternate cutting edges 60 and depressions 61 of arcuate cross-section which terminate in a sharp point for piercing the fin-stock and cutting holes progressively in the entire series of webs. The tapered edges 60 sever or rupture the strips of fin-stock to progressively enlarge the holes to the outer diameter of the tool 40 and cut V-shaped tongues $a'$ around the holes and bend the tongues transversely of said strips. The diameter of each piercing tool 40 is sufficient to cut tongues of greater length than the width of the spaces between the strips of fin-stock for producing interlap of the tongues. Each tube-section $b$ becomes a part of the unit and has an internal diameter equal substantially to the outer diameter of the piercing tool 40 and the stem 41, for slidably fitting on a stem, and for permitting the tube to slide onto the stem and over the tool, and the tool to slide out of the tube-section. The outer diameter of each tube-section is greater than the greatest diameter of the tool, an amount equal to the difference between the inner and outer diameters of the tube-section, for enlarging the holes and expanding the tongues cut by the tools 40.

An abutment or shoulder 45 on each stem 41 is adapted to engage and move a tube-section $b$ through the holes cut in the strips of fin-stock by the tool 40 and across the slots 36 in one of the rolls 24 and 25. Each tube-section $b$ is held on a stem 41 in trailing relation to a tool 40 so it will follow the tool progressively through the holes cut in the fin-stock by the tools and a series of slots 36 in one of the rolls 24, 25. Each stem 41 and tool 40 thereon can be slidably withdrawn from the tube-section and its coacting roll, after said tube-section has been secured in the strips of fin-stock. The forward end of each tube-section $b$ is tapered or beveled to enlarge the holes formed by the tools 40 and reshape the tongues $a'$ to conform to the periphery of said tube-section $b$.

The leading ends of tube-sections $b$ on stems 41, as shown in Figs. 8, 15 and 16, when the tools 40 have been lowered for a piercing operation, are successively guided in blocks 83 and 85, for rectilinear travel through the strips $a$ and the slots 36 in disks 27. Block 83 is mounted on outer side of bracket 32 and bracket 85 is located in said bracket. Block 83 is provided with a vertical slot 82 with an open upper end, through which the inner ends of tube-sections 41 and the tools 40 can be lowered into and raised out of alignment with the notches 36 in disks 27. When the lower of said sections is lowered, it will rest on the bottom of slot 82 and both of said sections will be guided against transverse displacement. Block 83 is also provided with a wall 83' at its inner side which has an opening 83a for guiding the lower tool 40 and the lower tube-section during the initial inward movement of said tool. The top of wall 83' has a seat 83b which supports and guides the upper tube-section 40 during said initial inward movement. Block 85 has at its outer side, openings 85a and 85b aligned with seat 83b and opening 83a in block 83 for guiding the tools and tube-sections in axial alignment with the notches 36 in disk 37 during the completion of the operative strokes of said tube-sections and tools. Slots 84 extend from openings 85a and 85b to one side of block 85 for the rest of the ends of the tube-sections which project from the rolls 24 and 25 after the tools are retracted from the tube-sections, thus permits the strips $a$ to be advanced with the tube-sections therein, for successive piercing operations at longitudinally spaced points on the strips $a$.

During each reciprocation of stems 41, the tools 40 thereon will progressively pierce and cut holes in the portion of the series of strips of fin-stock confined in the rolls, with surrounding tongues, and bend the tongues transversely of the strips into interlapping relation, and the trailing tube-sections $b$ on the stems 41 will be driven through the holes formed in the strips by the tools 40, enlarge the holes and reshape the tongues into a tight press-fitting relation with the inner peripheries of the interlapped tongues. During the retractile stroke of stems 41, the tube-section will remain fixed in the strips to become a part of the heat transfer unit and the tools and stems will be withdrawn from rolls 24 and 25 and into block 83 so that the rolls 24 and 25 will be rotatable to advance the strips a and tube-sections b secured therein. The edges of the slots 36 in the discs 27 engage the tube-sections inserted into the rolls 24 and 25 to advance the entire series of strips a and the tube-sections secured therein step-by-step by mechanism hereinafter described. The series of slots 36 in the rolls 24 and 25 are circumferentially spaced apart conformably to the spacing of the tube-sections desired in the finished units.

Reciprocatory strokes are imparted to the stems 41, by a hydraulic ram which includes a cylinder 50, a piston 51, in said cylinder, and a stem 52 operated by said piston and secured to head 44. An electric motor 53 drives a pump 54 which is adapted to deliver fluid under pressure to a valve 55 which, by means of a lever 56, is adapted to selectively control the flow of fluid under pressure through a pipe 57 to one end of cylinder 50 for imparting out strokes to piston 51 and stems 41 and to control the flow of fluid through pipe 58 from valve 55 to the opposite end of cylinder 50 for retracting the head 44 and stems 41.

Rolls 24 and 25 are oppositely rotated step-by-step for spotting successive portions of the strips a of fin-stock, into alignment with successive series of slots 36 in the rolls 24 and 25 according to the spacing of the tube-sections desired in the completed heat transfer unit, for successive cutting and tube-inserting operations by mechanism which comprises a ratchet wheel 62 which is keyed to the shaft 28 of roll 25, a gear 63 rotatable with ratchet wheel 62, a gear 64 on the shaft 28 of roll 24, a member 66 which is rotatably mounted on the shaft 28 of roll 25, a depending arm 67 fixed to member 66, and a spring-pressed pawl 65 which is slidably mounted on member 66 and is adapted to rotate gear 63 step-by-step in one direction. Arm 67 is operated to rotate member 66 after stems 51 and tools 40 have been retracted from the rolls 24, 25. The stroke of arm 67 is limited by adjustable stops 68 and 69. A cable 70 is secured to a clamp 71 which is movable with head 44 on the piston stem 52 for imparting operative strokes to arm 67 for rotating ratchet wheel 62, gears 63 and 64, and rolls 24 and 25 step-by-step to advance the entire series of webs a and the tube-sections b which have been secured in the webs. Cable 70 is guided by sheaves 73, 74, and 75 to a cushioned connection 76 with arm 67. A connection including a cable 78, which is connected to the lower arm of arm 67 and a spring 79, and guided by a sheave 80, imparts retractile strokes to arm 67 and the idle stroke of pawl 65 when the tools 40 and stem 41 have been withdrawn from the rolls 24 and 25. This exemplifies mechanism for advancing the entire series of strips a and the tube-sections b which have been secured therein, step-by-step to position the strips a for the successive insertion of tube-sections b at points spaced along the entire length of the strips according to the spacing of the tube-sections desired in the finished units and for the operation of the cutting tools successively through the series of slots 36 in the rolls 24 and 25. When rolls 24 and 25 are rotated by pawl 65, the edges of slots 36 in discs 27 will engage the inserted tube-sections and drag the webs from the reels 21. The open ends of slots 36 permit the tube-sections to be disengaged from the rolls and to move rectilinearly with the webs.

The operation of the apparatus is as follows: a series of webs or continuous strips a of flexible fin-stock, corresponding in number to the number of cross-fins desired in a completed heat transfer unit, are provided by the reels 21. The webs are individually guided by comb-bar 22 to the rolls 24 and 25. The leading end portions of the webs are extended to the spaces between discs 27 of rolls 24 and 25. The points at which the first pair of tube-sections are to be inserted will be aligned with the upper aligned series of slots 36 in roll 25 and the lowermost series of aligned slots 36 in the discs 27 of the upper roll 24, respectively. The lower portion of the webs a will be transversely confined and supported between the discs 27 of the roll 25 and the upper portions of the webs will be transversely confined by the discs 27 of the upper roll 24. The upper end lower edges of the webs will be vertically confined between the spacers 29 on the upper roll 24 and the lower roll 25. The web-advancing mechanism may be operated to bring the leading end portions of the entire series of webs into position for the insertion of the pair of tube-sections adjacent one end of the fins which are formed from the webs. The rolls 24 and 25 support the webs for the web-piercing and cutting and the tube-inserting operations. While stems 41 are retracted from the rolls 24 and 25 and are raised (Fig. 5), tube-sections b are slipped onto the stems 41 into abutting engagement with shoulders 45 on said stems for forcing the tube-sections outwardly in trailing relation to the tools 40, during each out-stroke of said stems. The lower stem 41 is then lowered into slot 82 in block 83 and in axial alignment with the uppermost series of slots 36 in the discs 27 of roll 25 and the upper stem 41 will be aligned with the lowermost series of slots 36 in the discs 27 of the upper roll 24. An out-stroke is then imparted by the hydraulic power mechanism to the stems 41 for driving the tools 40 and the tube-sections b thereon through the entire series of webs.

During each out-stroke of each stem 41, it will drive a tool 40 and the tube-section b thereon through an aligned series of slots 36 in one of the rolls 24, 25 and crosswise through the entire series of strips a. The progressive performance of a tool 40 and a tube-section b in passing through the strips a is illustrated in Fig. 10. The point of each tool 40 successively pierces an aligned series of holes in the webs a which are confined between discs 27. The tapered cutting edges 60 of each tool will progressively rupture or cut the stock radially around said holes into surrounding V-shaped tongues a', enlarge the holes, and bend said tongues on successive strips a into interlapping relation until the holes are equal in diameter to the inner end of tool 40, as illustrated in the zone marked e (Fig. 10). The successive shapes of the tongues during a cutting and bending operation are diagrammatically indicated by dotted lines (Fig. 14). The inclined edge b' of tube-section b trailing the inner end of each tool 40 enlarges the holes and bends the tongues outwardly as indicated at the zone f (Fig. 10). The cylindrical portion of the tube-section b following its beveled front end b' will progressively reshape the tongues in their interlapped relation, so that their inner peripheries will closely conform to, and have pressure engagement or a press-fit with the outer periphery of the tube-section, as indicated in the zone g (Fig. 10). When the tube-section has been driven through the entire series of strips a and the tongues have been reshaped as aforesaid, there will be a tight press-fit between the tube-sections and portions of the tongues on all of the webs, and between the interlapped tongues. The strips a will then be fixedly secured in the desired spaced relation on the tubing with high thermal conductive efficiency.

Each fin-cutting and tube-inserting operation will result in securing a pair of tube-sections b in the entire series of web from which the entire number of fins for a finished unit are produced. After each of said operations, piston stem 52 of the hydraulic power mechanism is operated to retract head 44 and stems 41 to withdraw said stems and the tools 40 from the tube-sections secured in the webs and to release the rolls 24 and 25 for rotation and to permit said tube-sections to be advanced with the webs. During the retraction of head 44 and stems 41, clamp 71 will operate cable 70 and the cushioned connection 76 for imparting an operative stroke to arm 67, after the tools 40 have cleared the tube-sections in the rolls 24 and 25. Arm 67 will then operate pawl 65 to rotate ratchet wheel 62, gears 63 and 64, rolls 24 and 25 one step. During this rotation of rolls 24 and 25, the edges of slots 36 in discs 27 will engage the tube-sections *b* last fixed in the webs and advance the webs equidistantly. Slots 36 will permit the inserted tube-sections to move rectilinearly and longitudinally with the webs. The rolls 24 and 25 will be rotated to spot the succeeding series of aligned slots 36 therein for the insertion of the next pair of tube-sections and the next fin-cutting operation. Next, the stems 41 will be again loaded with tube-sections *b* and lowered into alignment with the lowermost series of the slots 36 in discs 27 of upper roll 25 and the upper slots 36 in the lower roll 24 for the next fin-piercing and tube-inserting operation. During this operation of stems 41, clamp 71 will follow head 44 on the piston stem 52 and spring 79 will operate cable 78 to impart a retractile or idle stroke to arm 67. Rolls 90 support the assembled strips and tubing sections.

These operations are repeated until tube-sections *b* have been inserted in desired spaced relation throughout the length of the webs *a*. The webs are then severed on lines *x—x* into sections between the tube-sections to form units of fins and tube-sections with spacing and numbers desired in a complete heat transfer unit, such as an evaporator. A series of rollers 90 are adapted to support the suited strips and tube-sections after they leave the rolls 24 and 25.

To complete the units, the ends of the tube-sections in each unit may be serially connected by bends, as well understood in the art.

The spacing between the fins in the units may be varied by using discs 27 of different thickness. The spacing between the tube-sections may be varied by using discs 27 which are provided with differently spaced series of notches 36 in the rolls 24 and 25. The length of the fins may be varied by correspondingly varying the longitudinal spaces between the cuts across the fin-strips.

The apparatus is adapted to simultaneously insert a pair of tubes in strips *a* when two rows of tube-sections are included in a unit. By removing one of the tools 40 and the stem 41 on which it is secured from the head 44, the tool on the remaining stem will be adapted to cut a single series of holes in the strips for the insertion of a single tube.

The invention exemplifies apparatus for individually securing strips of fin-stock in the spaced relation for the completed units, successively puncturing and rupturing the strips to form holes surrounded by integral tongues of greater length than the spaces between the strips, successively puncturing and rupturing the strips to form holes surrounded by integral tongues of greater length than the spaces between the strips, successively bending the tongues across said spaces and into interlapped relation, and enlarging the holes by forcing through them and between the tongues, tube-sections which become a part of the unit, and having a greater diameter than the previously formed holes, will expand and reshape the tongues for a tight press-fit around and to conform their inner faces to the outer periphery of the tube-sections and thereby fixing the webs for the desired spacing of the fins and efficient thermal relation on the tubing, of the completed unit. This results in the fabrication of units in which the fins have tongues with a press-fit around and conforming substantially to the tube-sections for efficiency in heat transfer which is of great advantage when the strips are formed of extremely thin metal.

The invention also exemplifies apparatus successively cutting holes in a series of continuous webs equal in number to the cross-fins desired in a heat transfer unit and successively inserting tube-sections in the holes, for securing tube-sections in spaced relation throughout the entire length of the webs, and severing the webs between the tube-sections to provide units with combined fins and tube-sections of the desired number. This results in a high production of units and economical costs in production.

The invention also provides apparatus by which the tube-sections, in pairs or multiple, are simultaneously driven through holes pierced in and between the tongues on the fin-stock, for expeditious production.

The invention is not to be understood as limited to the details set forth, since these may be modified within the scope of the appended claims without departing from the scope and spirit of the invention.

Having thus described the invention what I claim as new and desire to secure by Letters Patent is:

1. Apparatus for making heat-exchange units which embody cross-fins and tubing extending through the fins, comprising: a series of holders on which continuous strips of fin-stock are wound, and in number corresponding to the number of fins in the heat-exchange unit; die-means in which complemental areas of the leading portions of the strips of the entire series are individually supported and confined in spaced relation for piercing; a tool for piercing openings for the insertion of tubing in said areas of the leading portions of the strips, provided with means for inserting tubing in said openings and leaving the tubing assembled with the strips, said die-means including means for advancing the assembled strips and tubing, and mechanism for intermittently operating the die-means to advance the assembled strips and tubing for piercing and inserting operations in successive portions of the strips to produce a structure which is severable into heat-transfer units, each including tubing and fins.

2. Apparatus for making heat-exchange units which embody cross-fins and tubing extending through the fins, comprising: a series of holders on which continuous strips of fin-stock are wound, and in number corresponding to the number of fins in the heat-exchange unit; a plurality of die-means in which complemental areas of the leading portions of the strips of the entire series are individually supported and confined in spaced relation for piercing; a tool operable to pierce openings for the insertion of tubing in said areas of the leading portions of the strips, provided with means for inserting tubing in said openings and leaving the tubing assembled with the strips, said die-means including means for advancing the assembled strips and tubing, and mechanism for intermittently operating the die-means to advance the assembled strips and tubing for piercing and inserting operations in successive portions of the strips to produce a continuous structure which is severable into heat-transfer units, each including tubing and fins.

3. Apparatus for making heat-exchange units which embody cross-fins and tubing extending through the fins, comprising: a series of holders on which continuous strips of fin-stock are wound, and in number corresponding to the number of fins in the heat-exchange unit; a plurality of coacting die-elements in which complemental areas of the leading portions of the strips of the entire series are individually supported and confined in spaced relation for piercing; a plurality of tools operable to simultaneously pierce openings for the insertion of tubing in said areas of the leading portions of the strips, provided with means for inserting a plurality of tubing-sections in said openings and leaving the tubing assembled with the strips, said die-means including means for advancing the assembled strips and tubing, and mechanism for intermittently operating the die-means to advance the assembled strips and tubing for piercing and inserting operations in successive portions of the strips to produce a continuous structure which is severable into units, each including tubing and fins.

4. Apparatus for making heat-exchange units which embody cross-fins and tubing extending through the fins, comprising: a series of holders on which continuous strips of fin-stock are wound, and in number corresponding to the number of fins in the heat-exchange unit; a pair of coacting relatively movable die-elements in which complemental areas of the leading portions of the strips of the entire series are individually supported and confined in spaced relation for piercing; a tool operable to pierce openings for the insertion of tubing in said complemental areas of the leading portions of the strips, provided with means for inserting tubing in said openings and leaving the tubing assembled with the strips, said die-elements having means for advancing the assembled strips and tubing, and mechanism for intermittently operating the die-elements to advance the assembled strips and tubing for piercing and inserting operations in successive portions of the strips to produce a continuous structure which is severable into heat-transfer units, each including tubing and fins.

5. Apparatus for making heat-exchange units which embody cross-fins and tubing extending through the fins, comprising: a series of holders on which continuous strips of fin-stock are wound, and in number corresponding to the number of fins in the heat-exchange unit; a pair of coacting relatively movable die-elements in which complemental areas of the leading portions of the strips of the entire series are individually supported and confined in spaced relation for piercing; a plurality of tools operable to simultaneously pierce openings for the insertion of tubing in said areas of the leading portions of the strips, and provided with means for inserting a plurality of tubing sections in said openings and leaving the tubing assembled with the strips, said die-elements including means for advancing the assembled strips and tubing, and mechanism for intermittently operating the die-elements to advance the assembled strips and tubing for piercing and inserting operations in successive portions of the strips to produce a continuous structure which is severable into units, each including tubing and fins.

6. Apparatus for making heat-exchange units which embody cross-fins and tubing extending through the fins, comprising: a series of holders on which continuous strips of fin-stock are wound, and in number corresponding to the number of fins in the heat-exchange unit; a pair of coacting feed-rolls provided with aligned notches and means for individually confining and supporting between the rolls complemental areas of the leading portions of the strips of the entire series in spaced relation for piercing; a pointed tool operable to simultaneously pierce openings for the insertion of tubing in said areas of the leading portions of the strips, provided with means for inserting tubing in said openings and leaving the tubing assembled with the strips, the notches in the feed-rolls being adapted to advance the assembled strips and tubing, and mechanism for intermittently operating the feed-rolls to advance the assembled strips and tubing for piercing and inserting operations in successive portions of the strips to produce a continuous structure which is severable into units, each including tubing and fins.

7. Apparatus for making heat-exchange units which embody cross-fins and tubing extending through the fins, comprising: a series of holders on which continuous strips of fin-stock are wound, and in number corresponding to the number of fins in the heat-exchange unit; a pair of coacting feed-rolls provided with aligned notches and means for individually confining and supporting between the rolls complemental areas of the leading portions of the strips of the entire series in spaced relation for piercing; reciprocable pointed tools for piercing aligned openings in said areas of the leading portions of the strips for the insertion of tubing and provided with means reciprocable in the notches for inserting tubing in said openings and leaving the tubing assembled with the strips, the notches in the rolls being adapted to advance the assembled strips and tubing, means for reciprocating the tools in said notches to pierce the openings in the strips, insert the tubing in the strips and leave the tubing assembled with the strips, and mechanism for intermittently operating the rolls and advancing the assembled strips and tubing for successive piercing and inserting operations in the strips to produce a continuous structure which is severable into units, each including tubing and fins.

References Cited in the file of this patent

UNITED STATES PATENTS

| | | |
|---|---|---|
| 600,498 | Morrow | Mar. 8, 1898 |
| 649,762 | Saltzkorn et al. | May 15, 1900 |
| 875,746 | Stolp | Jan. 7, 1908 |
| 1,000,144 | Beebe | Aug. 8, 1911 |
| 1,024,124 | Dietz | Apr. 23, 1912 |
| 1,703,527 | Henshall | Feb. 26, 1929 |
| 1,742,414 | Rogers | Jan. 7, 1930 |
| 2,093,202 | Maynes | Sept. 14, 1937 |
| 2,309,887 | De Camp | Feb. 2, 1943 |
| 2,398,476 | Swanson | Apr. 16, 1946 |
| 2,410,372 | Wales | Oct. 29, 1946 |
| 2,632,236 | Dodge | Mar. 24, 1953 |
| 2,688,178 | Boyd | Sept. 7, 1954 |

FOREIGN PATENTS

| | | |
|---|---|---|
| 356,607 | Great Britain | Sept. 10, 1931 |